PLUGGABLE MEMORY MODULE

Filed July 8, 1964 3 Sheets-Sheet 1

INVENTOR.
SEYMOUR R. CRAY
BY
Cushman, Darby & Cushman
ATTORNEYS

PLUGGABLE MEMORY MODULE

INVENTOR
SEYMOUR R. CRAY

BY Cushman, Darby & Cushman
ATTORNEYS

INVENTOR
SEYMOUR R. CRAY

By
Cushman, Darby & Cushman
ATTORNEYS 3,278,806
PLUGGABLE MEMORY MODULE
Seymour R. Cray, Chippewa Falls, Wis., assignor to Control Data Corporation, Minneapolis, Minn., a corporation of Minnesota
Filed July 8, 1964, Ser. No. 381,101
4 Claims. (Cl. 317—100)

This invention relates to a pluggable memory module and, more particularly, to a storage unit which may be readily inserted or removed from a data processing machine.

In conventional data processing equipment memory units are utilized for information storage, these units being relatively fixed with respect to the computer such that when a unit becomes defective, it is a complicated operation to remove the faulty unit in order to repair or replace it. This results in a considerable amount of valuable computer time being wasted before a workable memory is returned to the machine.

It is for the purpose of overcoming these shortcomings that the improved memory device of the invention has been developed. The pluggable memory module of the invention is adapted to be easily inserted into, or removed from, a data processing machine thereby minimizing wasted computer time.

Another object of the invention is to provide an improved module structure which is capable of easy disassembly to facilitate repair of a defective portion thereof.

Another purpose of the invention is to provide an extremely small and compact memory unit allowing each component to be positioned closer to one another thereby resulting in a faster memory reference cycle for the computer.

A further object of the invention is to provide an improved pluggable memory module having heat dissipation means for individual storage components to assist in promoting the stable operation thereof.

Ancillary to the immediately preceding object, it is a further object of the invention to provide a pluggable memory module, as described, wherein the heat dissipation means performs a secondary function of electrically shielding the storage components of the module thereby improving their reliability.

Further objects and the entire scope of the invention will become more fully apparent when considered in light of the following detailed description of an illustrative embodiment of this invention and from the appended claims.

The illustrative embodiment may be best understood by reference to the accompanying drawings, wherein.

Briefly, the invention comprises a memory module including a stacked arrangement of memory planes, or storage members, with cold plates interposed therebetween in spaced relationship, the plates aiding the dissipation of heat from the memory module as well as providing electrical shielding for the storage members. The memory plane and cold plate are stacked between driver circuits for the memory planes. The sandwiched arrangement is enclosed within a housing of heat dissipating material. To the exterior of the housing, adjacent the stack, are connected inhibit driver circuits. One end of the housing comprises a face plate which, when the module is in its operating position, engages the chassis of the data processing unit to assist in securing the module thereto. The opposite end of the housing is enclosed by an additional plate with which are associated insulating boards having conductor pins extending therefrom. These pins serve as the principal elements of the plug portion of the memory module. The pins are inserted in corresponding holes of a computer chassis when the module is plugged into the chassis.

Figure 1:
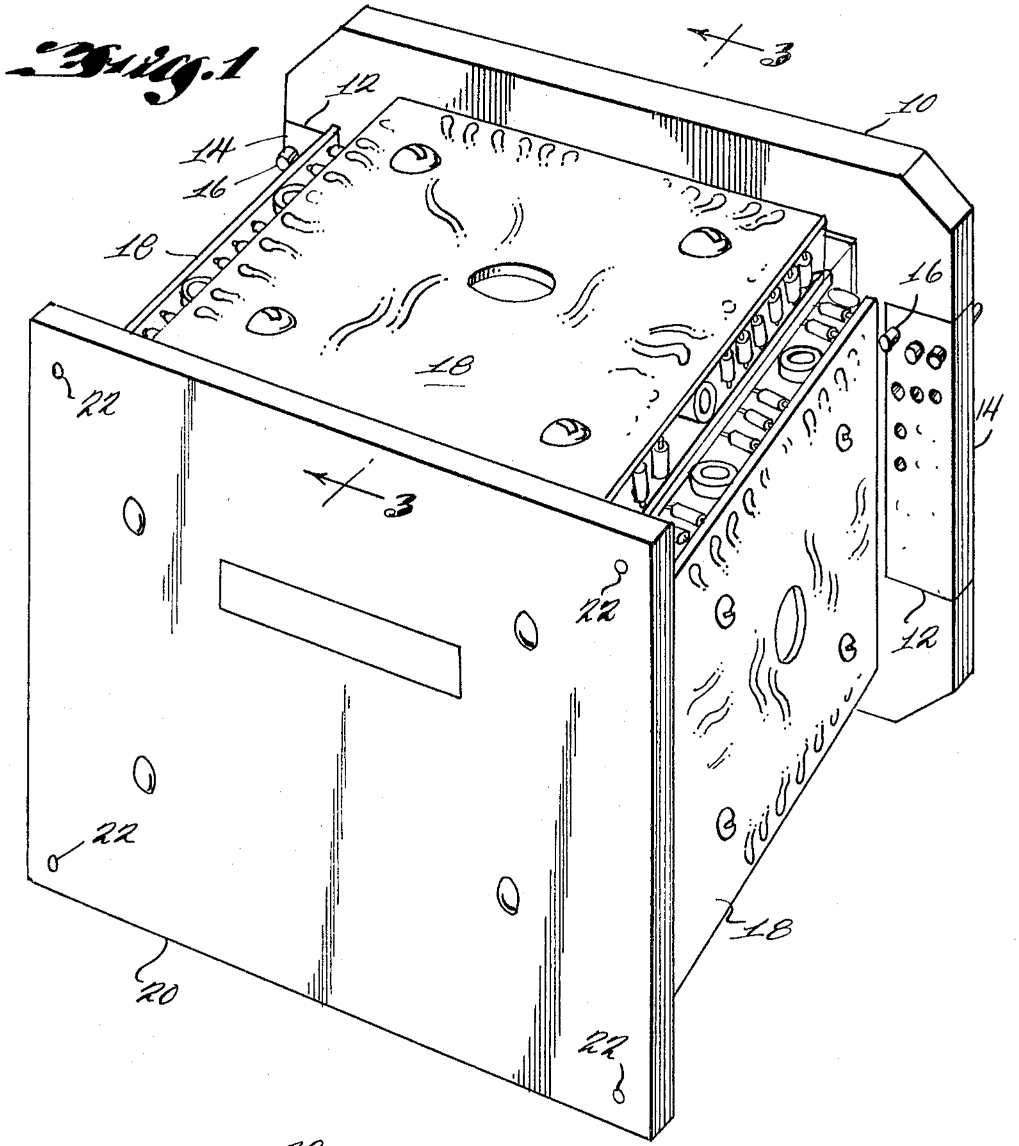
FIGURE 1 is a view in perspective of the assembled pluggable memory module which comprises the invention.

Referring first to FIGURE 1 of the drawings, the overall module structure as it appears upon completion will be described. The module structure comprises a plate 10 which serves as the rear member of the module, this plate being formed of heat conductive material such as aluminum. Recesses 12 are provided on opposite sides of the plate 10. Insulating boards 14 are inserted within these recesses to become an integral part of the rear member of the module. A plurality of pins 16, to which appropriate electrical connections may be made, are mounted in spaced relationship within boards 14. An elongated housing (not visible in FIGURE 1) is connected to the rear plate 10. Inhibit driver circuits 18 are attached to the exterior of the walls of the housing. Circuits 18 comprise conventional printed circuit boards having appropriate electrical components mounted thereon. A module face plate 20 is connected to the elongated housing on the opposite end thereof from plate 10 to complete exterior portions of the structure.

When the module is inserted within a computer chassis, pins 16 engage corresponding orifices in terminal boards provided within the chassis to position the rear end of the pluggable memory module. The module is firmly secured at its forward end by appropriate fastening means which connect the module face plate 20 to the chassis. Screw holes 22 are illustrated on the face plate suggesting one simple method of fastening the module. When a portion of the pluggable memory module is defective, all that is necessary to remove the module is to release the fastening means on the face plate 20 and pull the module to disengage pins 16 from the terminal boards. A spare module may then be placed in the computer chassis by reversing this operation. Utilizing this interchangeable structure, the "down" time of the computer may be appreciably decreased and a defective portion of the memory module may be repaired without sacrificing computer time since a spare module may be employed while the defective one is repaired.

Figure 2:
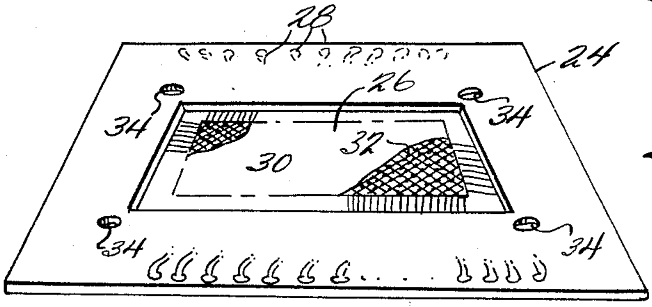
FIGURE 2 is a fragmentary perspective view of a memory plane utilized as a storage component of the memory module.

In FIGURE 2 of the drawings there is illustrated a memory plane, or storage member, which forms a portion of the storage section of the module. Each plane comprises a frame member 24 having a central opening 26 therein. The frame is provided with printed circuit wiring indicated generally at 28. Extending from the frame across the opening 26, and connected to appropriate portions of the printed circuitry, are vertical and horizontal drive wires which thread magnetic cores indicated generally at 30 to hold them in a grid-like fashion separated from one another. In addition to the drive wires, inhibit and sense wires are appropriately threaded through these toroidal-shaped cores. The drive, inhibit, and sense wires are indicated generally at 32. Within the frame 24, a plurality of holes 34 are provided. These holes serve to provide access for integration of a plurality of memory planes as will now be described with reference to FIGURE 3.

Figure 3:
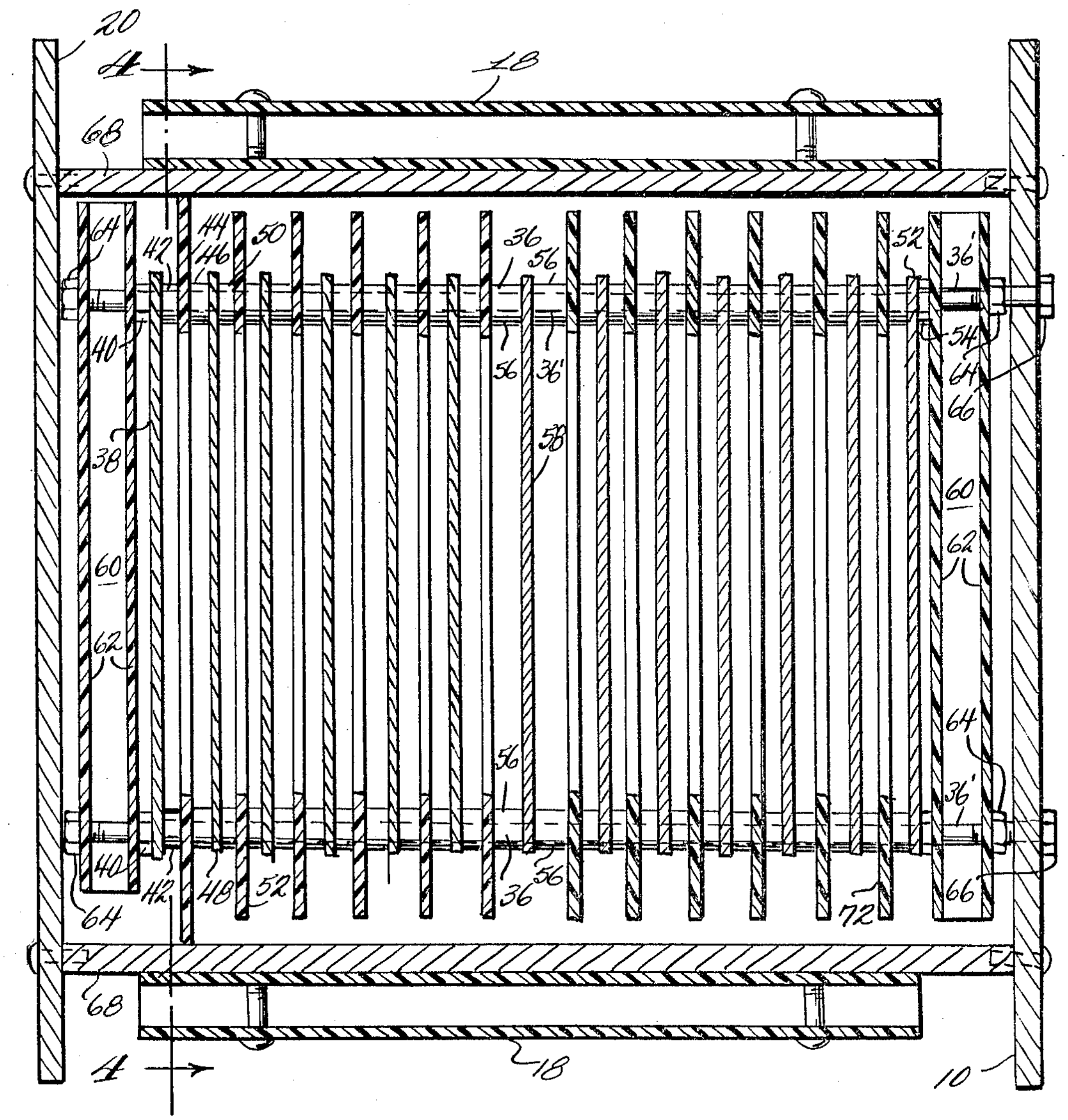
FIGURE 3 is a view in cross section of the pluggable memory module taken substantially along the line 3—3 of FIGURE 1.

In FIGURE 3 there is illustrated a cross sectional view of the entire pluggable memory module. In the fabrication of the storage portion of the module, the memory planes are assembled in half-stacks which are combined to complete the storage portion. For purposes of illustration, one half-stack will be explained in detail. The basic elements integrating the half-stacks are elongated rods 36. A first cold plate 38 having a plurality of holes therein to receive the rods 36 is positioned inwardly from one end of the rods and is prevented from moving outwardly by means of nuts 40 located inwardly of the ends of rods 36 by appropriate threading of the rod ends. Spacers 42 are mounted on the rods 36 on the opposite side of plate 38 from nuts 40. These spacers may be any suitable elements such as aluminum washers. A first memory plane 44 having its openings 34 corresponding to rods 36 is then stacked such that the plane 44 is positioned in contact with spacers 42. Spacers 46, identical with spacers 42, are then positioned on opposite sides of the memory plane 44 from spacers 42 and a second cold plate 48 is stacked adjacent spacers 46. Thereupon spacers 50 are added to the stack followed by a memory plane 52. This stacking arrangement continues in the same manner until a total of five memory planes similar to the plane 52 are stacked with respect to the outer memory plane 44. On completion of this phase of the stacking operation, a first half-stack of memory planes is formed. It should be noted that the outside memory plane 44 projects in a vertical direction a greater distance than plane 52, and all of the remaining planes. This is to provide a spacing function which will be described hereinafter.

A second half-stack is then assembled in the same manner as described with respect to the first stack commencing with a cold plate 52 being positioned with respect to nuts 54 positioned inwardly of the threaded ends of rods 36'. By repeating the stacking operation described with reference to the first half-stack, a second memory half-stack is assembled. The two half-stacks are then interconnected by means of appropriate spacers and fastening devices 56 such that a cold plate 58 is interposed between the two half-stacks. It should be noted that spacers 56 have greater widths than the other spacers 42, 46, 50, etc. thereby maintaining the two half-stacks a greater distance apart than the planes of each half-stack.

With the memory stack completed, driver units 60, having apertures therein corresponding with the position of rods 36 nad 36', are mounted to the memory stack at opposite ends thereof by nuts 64. These drivers comprise spaced printed circuit boards 62 having appropriate circuitry (omitted for convenience of illustration) associated therewith. One of drivers 60 is electrically connected to the vertical drive wires of the memory planes and the other driver is appropriately joined to the horizontal wires of the memory planes. These connections have also been omitted for convenience.

As can be seen in the drawings, the rods 36' extend outwardly of the nuts 64. These rods project through apertures in the rear face plate 10 to permit appropriate nuts 66 to be attached to the ends of rods 36' thereby anchoring the stacked memory planes and drivers 60 to plate 10. An elongated housing 68 is also mounted to plate 10 by suitable fastening means. This housing comprises a plurality of panels, or walls, external of the unitized memory stack and drivers 60, extending over the assembled length thereof. To the opposite ends of the housing 68 from plate 10, the face plate 20 is attached by suitable fastening means. Inhibit circuits extending longitudinally of the module are fastened to each of the sides of the housing 68 on the outside thereof. These inhibit circuits are indicated at 18 and are similar in construction to the horizontal and vertical drive circuits 60.

It should be noted that the housing 68 is spaced with respect to the memory stack by means of a vertically extending lip 70 on one outer memory plane 44 and is spaced horizontally by means of a similar lip on the other outer plane 72. This latter lip extends horizontally and is therefore not shown in FIGURE 3.

Figure 4:
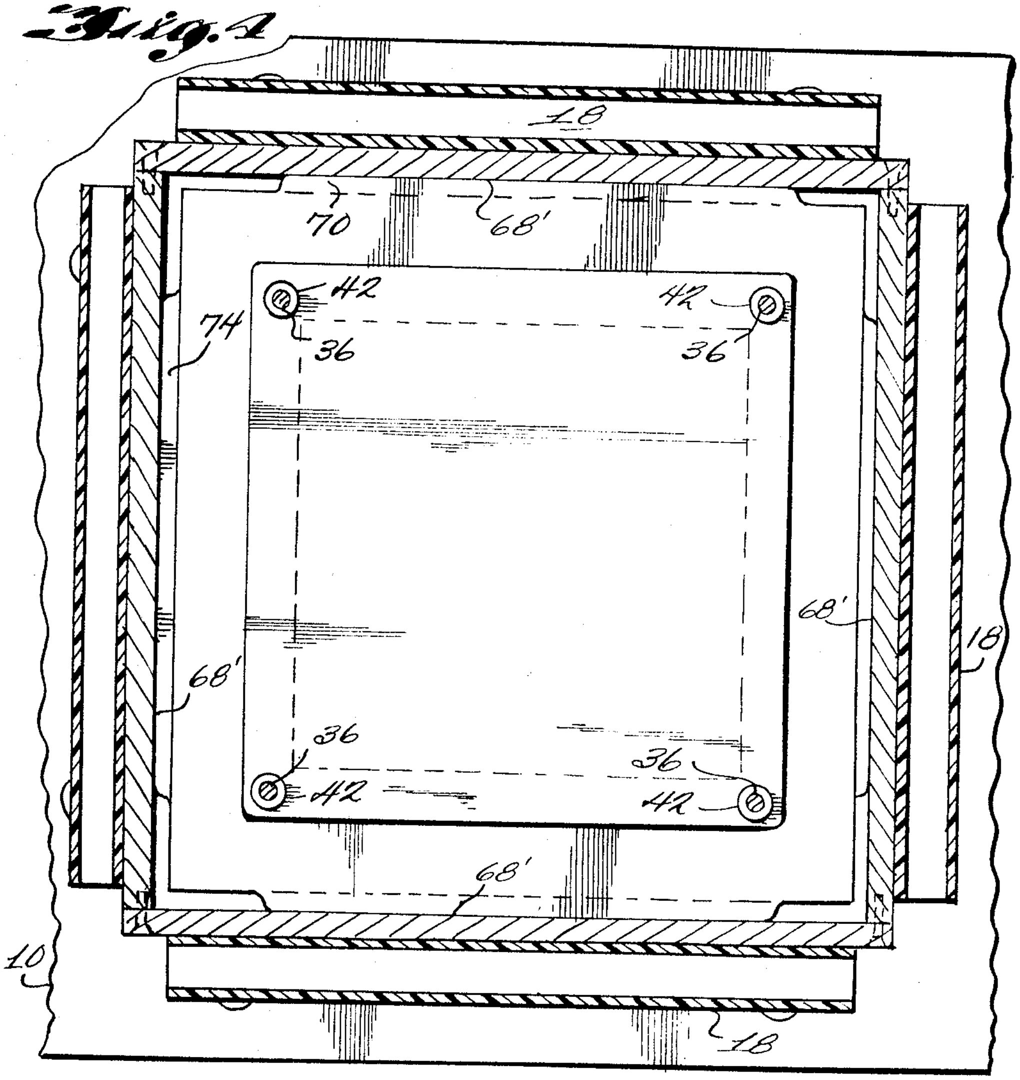
FIGURE 4 is a view in cross section of the pluggable memory module taken substantially along line 4—4 of FIGURE 3.

In FIGURE 4 both lips are visible, the horizontal lip being designated as 74. These lips space the housing from the memory stack, and since the lips extend over only a portion of the width of the memory planes, the spacing arrangement permits access for wiring to the memory planes.

From the view of FIGURE 4, the structure of the elongated housing may be appreciated. The housing 68 comprises four interconnected walls 68'. The manner by which the inhibit drivers 18 are arranged external of the elongated housing is also more clearly indicated in this view, each inhibit driver being connected to a side of the housing.

Figure 5:
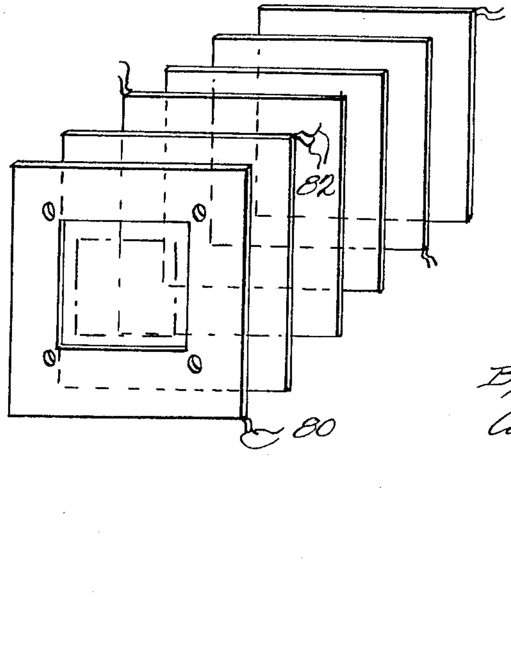
FIGURE 5 is an exploded view in perspective of the storage components of one half of the memory stack, illustrating the relative position of the sense windings for adjacent memory planes.

In FIGURE 5 there is illustrated an exploded view illustrating diagrammatically the arrangement for orienting the various memory planes. Although the electrical connections for the driving arrangements for the planes have been omitted as they do not constitute a portion of the invention, nonetheless, an important factor involved in the arrangement of the memory planes is the appropriate positioning of the sense wires from the planes. The sense drivers are positioned external of the pluggable memory module and do not constitute a portion of the invention. However, a necessary consideration in the design of the module is the appropriate positioning of the leads from the memory planes to the sense drivers to prevent cross talk which might result in inaccurate information being read. In order to reduce the cross talk of the sense leads, the leads are attached to the corner portion of the phenolic frame members of the memory planes. Adjacent memory planes are displaced at 90° with respect to one another such that the sense windings of adjacent planes are separated. From FIGURE 5 this may be appreciated as the front memory plane has its sense winding 80 at its lower right-hand corner whereas the adjacent plane has its senses lead 82 at the upper right-hand corner. By continuous counterclockwise 90° relative displacement of the memory planes, this relationship is continued. Generally illustrated in FIGURE 5 are the six memory planes of a half-stack. When arranged with respect to a second half-stack, the sense windings of the facing planes of each stack are at diagonally opposite corners.

With the structure as just set forth, a compact pluggable memory module may be realized. If a portion of the module is defective it may be removed from the computer chassis as previously described and by loosening the appropriate fastening elements, any portion of the module is readily accessible for repair. By providing such a compact arrangement of the operative parts of the memory module, the referencing of the memory by the computer is reduced due to the mere physical relationship of the parts. The cold plates interposed between each of the memory planes and between the outer memory planes and the vertical and horizontal drivers serve as heat conductive paths to permit heat to move outwardly to the housing. The housing 68 is of heat conductive material to absorb heat developed by elements within the housing as well as the heat developed by the inhibit drivers attached thereto. Heat is transferred from the housing and drivers by conduction and convection to the rear and face plates of the module to be dissipated to an appropriate computer cooling arrangement. An example of a cooling arrangement utilizing a pluggable memory module is set forth in the copending application Ser. No. 381,100, filed July 8, 1964, entitled Cooling System for Data Processing Equipment by Maurice D. Roush and Earl A. Maorol, Jr., filed concurrently herewith.

By providing these cold plates between the operative portions of the memory module, heat dissipation means is provided for individual memory components thereby assisting in monitoring the temperature to provide stable magnetic characteristics. The cooling plates also serve to provide electrical shielding for the memory planes preventing cross talk between the components which could result in faulty operation.

The above described embodiment is illustrative of a preferred embodiment of the invention but is not intended to limit the possibilities of insuring a compact easily replaceable memory module. The module designed as disclosed herein is an example of an arrangement in which the inventive features of this disclosure may be utilized, and it will become apparent to one skilled in the art that certain modifications may be made within the spirit of the invention as defined by the appended claims.

What is claimed is:

1. A pluggable memory module for use within a data processing machine comprising: a plurality of spaced heat conductive plates having electrical shielding characteristics, storage members interposed between pairs of said plates and spaced therefrom, said plates and the storage members having correspondingly positioned apertures therein; means for interconnecting said plates and the storage members to form a storage assembly, said interconnecting means including a plurality of rods passing through said apertures, and fastening means for fixing said plates and storage members with respect to the rods; a first driver means having apertures therein corresponding to those of said plates and the storage members, and means for mounting said driver means at opposite ends of said storage assembly by passing said rods through the apertures of said driver and fastening the driver means in spaced relationship adjacent the storage assembly; additional heat conductive plates attached to said assembly at the opposite ends thereof, said additional plates being positioned on the opposite sides of said driver means from the assembly; one of said additional heat conductive plates having at least one recess therein, insulating boards inserted within said recesses, and a plurality of spaced pins attached to said boards; a housing attached to and extending between said additional heat conductive plates, said housing comprising a plurality of heat conductive walls enclosing said storage assembly; and additional driver means attached to said walls externally of the housing.

2. A pluggable memory module for use within a data processing machine comprising: a plurality of spaced heat conductive plates having electrical shielding characteristics, storage members interposed between pairs of said plates and spaced therefrom, means for removably interconnecting said plates and the storage members to form a storage assembly, an additonal heat conductive plate attached to said assembly at at least one end thereof, a housing of heat conductive walls enclosing the sides of said assembly and attached to said additional heat conductive plate, pluggable connector means attached to said assembly to permit connection of the module with the data processing machine, and driver means removably joined to said assembly for driving said storage members.

3. A pluggable memory module as set forth in claim 2 wherein said additonal heat conductive plate has at least one recess therein, and said connector means comprises an electrical insulating board within each recess and a plurality of spaced pins attached to said board.

4. A pluggable memory module as set forth in claim 2 wherein said driver means is enclosed within said housing and is positioned between the storage assembly and said additional heat conductive plate.

References Cited by the Examiner

UNITED STATES PATENTS

| | | | |
|---|---|---|---|
| 3,179,913 | 4/1965 | Mittler et al. | 317—101 |
| 3,184,649 | 5/1965 | Singletary | 317—101 |
| 3,187,210 | 5/1965 | Ost | 317—100 |
| 3,191,099 | 5/1965 | Rezek | 317—101 |

ROBERT K. SCHAEFER, *Primary Examiner.*

M. GINSBURG, *Assistant Examiner.*